US012652370B2

(12) United States Patent
Ishikawa et al.

(10) Patent No.: US 12,652,370 B2
(45) Date of Patent: Jun. 9, 2026

(54) VIRTUAL REALITY CONFERENCING SYSTEM

(71) Applicant: Yazaki Corporation, Tokyo (JP)

(72) Inventors: Takeshi Ishikawa, Shizuoka (JP); Yuki Ebata, Shizuoka (JP); Eri Moriyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 123 days.

(21) Appl. No.: 18/773,034

(22) Filed: Jul. 15, 2024

(65) Prior Publication Data

US 2024/0372969 A1     Nov. 7, 2024

Related U.S. Application Data

(63) Continuation of application No. PCT/JP2023/011665, filed on Mar. 23, 2023.

(30) Foreign Application Priority Data

Mar. 28, 2022     (JP) ................................ 2022-052161

(51) Int. Cl.
*H04N 7/15* (2006.01)
*G06T 7/70* (2017.01)
*G06T 17/00* (2006.01)

(52) U.S. Cl.
CPC .............. *H04N 7/157* (2013.01); *G06T 7/70* (2017.01); *G06T 17/00* (2013.01); *H04N 7/152* (2013.01)

(58) Field of Classification Search
CPC .......... H04N 7/157; H04N 7/152; H04N 7/15; G06T 7/70; G06T 17/00; G06F 3/04815; G06F 3/04845; G06Q 10/109
See application file for complete search history.

(56) References Cited

U.S. PATENT DOCUMENTS 10,542,238 B2    1/2020  Bergmann et al.
2003/0020711 A1   1/2003  Sakakura et al.
(Continued)

FOREIGN PATENT DOCUMENTS

EP      3522047 A2    8/2019
EP      3522048 A1    8/2019
(Continued)

OTHER PUBLICATIONS

Jun. 6, 2023—International Search Report—Intl App PCT/JP2023/011665.

*Primary Examiner* — Stella L. Woo
(74) *Attorney, Agent, or Firm* — Banner & Witcoff, Ltd.

(57)     ABSTRACT

A virtual reality conferencing system includes: a projection unit disposed at each of a plurality of separate sites and configured to project a stereoscopic image generated based on design data of a product in a VR space recognizable by a user at each site; and a display unit connected to the projection unit at each of the plurality of sites and configured to display the stereoscopic image recognized by the user on a screen. Each of the display units and the projection units includes an input unit that allows an input of one or more correction instructions indicating change, addition, and/or deletion to the stereoscopic image. The correction instruction input to the input unit at one site is transmitted to the display unit at another site via a communication system, and the correction instruction is reflected on a stereoscopic image projected at each projection unit.

5 Claims, 5 Drawing Sheets

(56) References Cited

U.S. PATENT DOCUMENTS

| | | | | |
|---|---|---|---|---|
| 2003/0020715 A1 | 1/2003 | Sakakura et al. | | |
| 2003/0023947 A1 | 1/2003 | Sakakura et al. | | |
| 2017/0269713 A1* | 9/2017 | Marks | .................... | A63F 13/86 |
| 2019/0067919 A1* | 2/2019 | Kawase | .................. | G06F 30/00 |
| 2019/0098255 A1* | 3/2019 | Bergmann | ......... | G06Q 10/1093 |
| 2021/0026998 A1* | 1/2021 | Hoppe | ................. | H04L 65/403 |
| 2021/0370172 A1 | 12/2021 | Black et al. | | |
| 2023/0128648 A1* | 4/2023 | Varada | ................... | H04L 67/55 |
| | | | | 709/204 |

FOREIGN PATENT DOCUMENTS

| | | | |
|---|---|---|---|
| JP | 2003-141196 A | 5/2003 | |
| JP | 2019-082997 A | 5/2019 | |
| JP | 2019-133528 A | 8/2019 | |
| JP | 2020-503574 A | 1/2020 | |

\* cited by examiner

FIG. 3

VIRTUAL REALITY CONFERENCING SYSTEM

CROSS-REFERENCE TO RELATED APPLICATIONS

This is a continuation of International Application No. PCT/JP2023/011665 filed on Mar. 23, 2023, and claims priority from Japanese Patent Application No. 2022-052161 filed on Mar. 28, 2022, the entire content of which is incorporated herein by reference.

TECHNICAL FIELD

The present disclosure relates to a virtual reality conferencing system that can be used when a company or the like develops various products.

BACKGROUND ART

For example, a cooperative virtual reality online conferencing platform disclosed in Patent Literature 1 shows a technique for replacing a conference on site with a conference in a common virtual space in virtual reality (VR). The platform includes three-dimensional (3D) point group data defining a virtual space, identifiers of a plurality of conference participants, and conference data including positions of a plurality of avatars corresponding to the conference participants in a virtual space. Further, the platform includes a processor that executes an instruction to start an online conference of a plurality of conference participants. A step of starting the online conference includes a step of providing an address of a 3D point group to each conference participant, and a step of transmitting 3D point group data and conference data to each conference participant. A current place of each avatar in the virtual space is transmitted to all the conference participants.

In the specification of Patent Literature 1, the "online conferencing platform" means a conference in which participants at different geographical places view the same computer screen while speaking via a voice line. In addition, a travel cost can be reduced by enabling a plurality of persons in charge to remotely inspect the contents of a scanning project such as a construction site or a crime site in a coordinated interactive manner. The plurality of persons in charge are located in the respective offices, and can participate at separate places (represented by scan data) in the VR.

CITATION LIST

Patent Literature

Patent Literature 1: JP2019-82997A

SUMMARY OF INVENTION

Technical Problem

When a company or the like develops various products, it may be preferable that a plurality of persons in charge who are present at a plurality of sites of the same company or a related company simultaneously gather at the same place, and examine a specific product.

For example, when a product of a wire harness to be mounted on a vehicle is newly developed or a specification of an existing product is changed, a routing path, a shape, and the like of the wire harness are determined by a vehicle manufacturer, and a design drawing is created. At this time, the vehicle manufacturer needs to examine from a viewpoint of the ease of assembly of the wire harness to the vehicle.

Further, based on the design drawing transmitted from the vehicle manufacturer, a component manufacturer has examined from a viewpoint of a component cost, a manufacturing cost, and the like of the wire harness, and has examined from a viewpoint of the ease of manufacturing the wire harness and the like, and creates a design drawing for the component manufacturer.

In the case of individually examining a plurality of independent sites as described above, when a problem is found in the design of the wire harness by the component manufacturer, the problem is transmitted to the vehicle manufacturer, and the vehicle manufacturer re-creates a design drawing in which the problem is corrected. When the component manufacturer receives the modified design drawing from the vehicle manufacturer, the component manufacturer creates a design drawing for the self company and remanufactures the wire harness again. Accordingly, there is a possibility that a change in specification and the like are repeated many times and a large time loss occurs. In particular, when the person in charge of each company examines the content of a two-dimensional drawing, it is difficult to grasp an actual three-dimensional shape of each part of the wire harness, and it is difficult to find a problematic part.

Therefore, it is conceivable that persons in charge at a plurality of sites, such as a vehicle manufacturer and a component manufacturer, simultaneously gather at the same place, and, for example, persons in charge at all the sites simultaneously examine while viewing an actual model of a wire harness or an actual jig disposed on one work table. Accordingly, the number of times repeating to change a manufacturing specification of the wire harness or the like may be reduced, and the development efficiency may be improved.

However, since a large number of persons in charge who gather at the same place need to move from various sites separated from each other to the place, burdens such as wasteful time and transportation costs associated with the movement increase.

For example, when the VR system disclosed in Patent Literature 1 is adopted, even if persons in charge at various sites do not move and gather in one place, three-dimensional shapes of the same product may be simultaneously grasped on screens of different computers. However, during the conference, it is not possible to change the specification of the product or the like by reflecting an opinion of each person in charge, and it is also not possible to view a change result. Therefore, it is necessary to repeat the conference several times each time a change is required, and an efficient conference cannot be held.

The present disclosure has been made in view of the above-described circumstances, and an object of the present disclosure is to provide a virtual reality conferencing system which is easy to improve the efficiency of a conference held among persons in charge at a plurality of sites for determining design specifications and manufacturing specifications of various products.

Solution to Problem

The above object of the present disclosure is achieved by the following configuration.

A virtual reality conferencing system includes:
a projection unit disposed at each of a plurality of separate
sites and configured to project a stereoscopic image
generated based on design data of a product in a VR
space recognizable by a user at each site; and
a display unit connected to the projection unit at each of
the plurality of sites and configured to display the
stereoscopic image recognized by the user on a screen,
in which
the display units at the plurality of sites are connected to
each other via a communication system,
each of the display units and the projection units includes
an input unit that allows an input of one or more
correction instructions indicating change, addition,
and/or deletion to the stereoscopic image, and
the correction instruction input to the input unit at one site
is transmitted to the display unit at another site via the
communication system, and the correction instruction
is reflected on a stereoscopic image projected at each
projection unit.

Advantageous Effects of Invention

According to a virtual reality conferencing system of the
present disclosure, it is possible to improve the efficiency of
a conference held among persons in charge at a plurality of
sites for determining design specifications and manufactur-
ing specifications of various products. That is, since the
participants of the conference can recognize a stereoscopic
image in a VR space by the projection unit, the participants
of the conference do not need to move and gather at one
place, and unnecessary time and cost accompanying the
movement can be significantly reduced.

BRIEF DESCRIPTION OF DRAWINGS

FIG. 3 is a block diagram showing a configuration
example of a conferencing management server and a pro-
jection unit.

DESCRIPTION OF EMBODIMENTS

Specific embodiments according to the present disclosure
will be described below with reference to the drawings.

Situation of Online Conference

Figure 1:
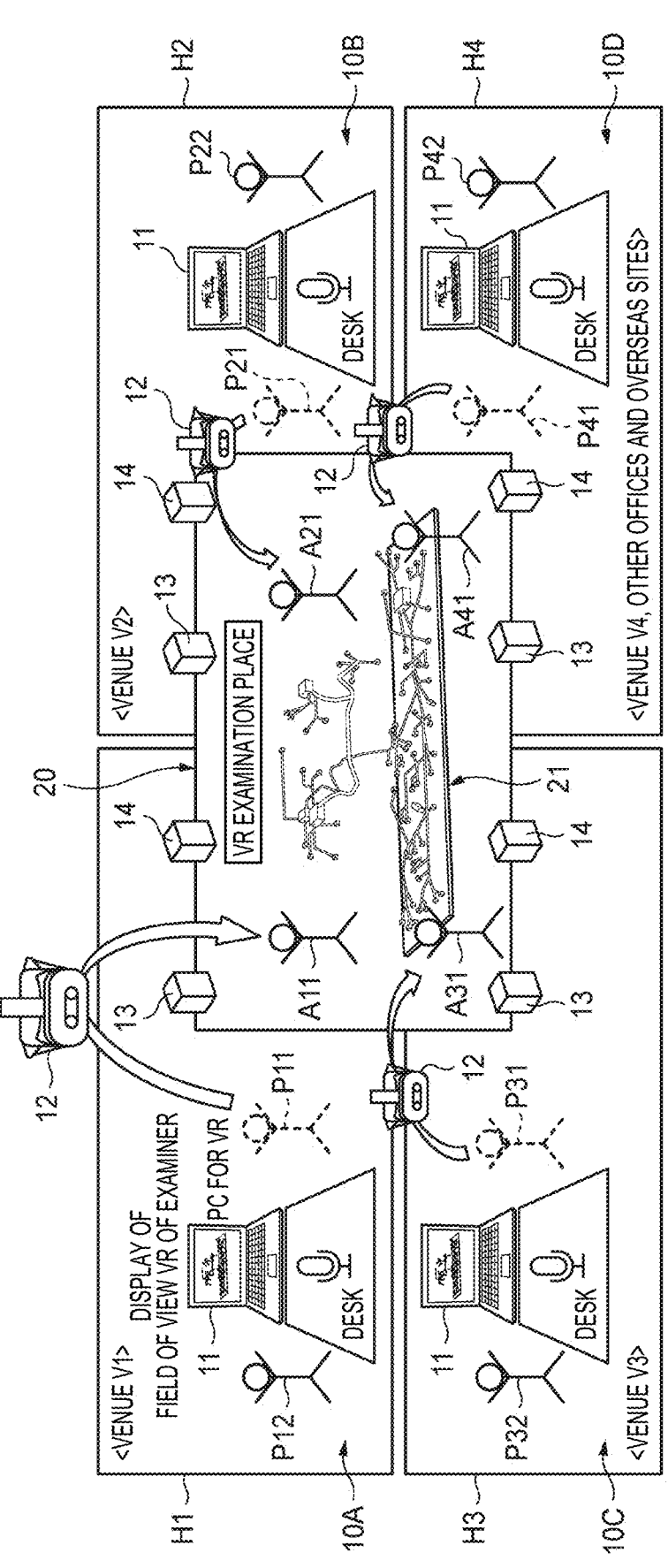
FIG. 1 is a schematic diagram showing a situation of an
online conference using a virtual reality conferencing sys-
tem of the present disclosure.

FIG. 1 is a schematic diagram showing a situation of an
online conference using a virtual reality conferencing sys-
tem of the present disclosure.
For example, when a product of a wire harness to be
mounted on an automobile is developed, first, a vehicle
manufacturer creates a design drawing, and a component
manufacturer of a wire harness or the like re-creates a design
drawing suitable for manufacturing a wire harness based on
the design drawing. However, when a problem occurs when
a wire harness manufactured based on the design drawing
created by the component manufacturer is routed in the vehicle, the information is transmitted to the vehicle manu-
facturer, the vehicle manufacturer re-creates the design
drawing, and the component manufacturer re-creates a
design drawing for the company itself based on the design
drawing. Therefore, the design needs to be redone at each
site every time a defect occurs, the efficiency of product
development decreases.
In order to improve the efficiency of product develop-
ment, persons in charge who belong to, for example, a
design site in a company group that provides a product of a
wire harness, a manufacturing site in Japan, a manufacturing
site in foreign countries, and a design site of an automobile
company that manufactures a vehicle equipped with a manu-
factured wire harness simultaneously participate in the same
conference and examine the product.
Here, when a product of a wire harness is developed, it is
necessary to appropriately determine a three-dimensional
shape of each part of the wire harness so as to pass through
an appropriate routing path in accordance with a structure of
a vehicle body to be mounted and an arrangement state of
various electric components. Further, it is necessary to
appropriately determine a layout of jigs used when manu-
facturing the wire harness in accordance with the three-
dimensional shape of each part of the wire harness. It is
necessary to appropriately determine a manufacturing pro-
cedure and the like in consideration of the work efficiency of
a manufacturing process of the wire harness. Further, it is
necessary to appropriately determine a branch position, a
wire length, and the like of the wire harness so that a
component cost of each electric wire or the like constituting
the wire harness can be reduced.
Therefore, a person in charge at each site needs to
examine from a unique viewpoint to be considered by each
person in charge while grasping the three-dimensional shape
of each part of the wire harness to be designed. Therefore,
in general, after a real model or the like is prepared, persons
in charge at all sites move and gather in the same exami-
nation place, and all members examine while viewing the
same real model and the like at the same place. Accordingly,
the efficiency of the conference can be increased. However,
since there are many cases where each site is present at a
place separated from each other by a distance such as
overseas, a burden such as time and costs required for
moving to hold a conference becomes extremely large.
In the case of using the VR conferencing system accord-
ing to the embodiment, for example, by holding a confer-
ence using a VR examination place 20 shown in FIG. 1, an
online conference can be held without movement of a person
in charge at each site.
In the example shown in FIG. 1, it is assumed that a
plurality of persons in charge present in each of the inde-
pendent four sites H1, H2, H3, and H4 simultaneously
gather in the common VR examination place 20 and hold an
examination conference. The sites H1, H2, H3, and H4
correspond to, for example, a design site in a company group
that provides a product of a wire harness, a manufacturing
site in Japan, a manufacturing site in foreign countries, and
a design site of an automobile company that manufactures a
vehicle equipped with a manufactured wire harness.
There is an actual venue V1 for an examination confer-
ence at a specific place in the site H1. Similarly, at a specific
place in each of the sites H2, H3, and H4, actual venues V2,
V3, and V4 for an examination conference are present.
In the example shown in FIG. 1, one or more examiners
P11 and one or more participants P12 are present in the
venue V1. Similarly, one or more examiners P21 and one or
more participants P22 are present in the venue V2. In addition, one or more examiners P31 and one or more participants P32 are present in the venue V3. One or more examiners P41 and one or more participants P42 are present in the venue V4.

In the venue V1, one or more display units 11, one or more projection units 12, one or more position sensors 13, and 14 are provided as system equipment 10A necessary for the online conference.

In the venue V2, one or more display units 11, one or more projection units 12, one or more position sensors 13, and 14 are provided as system equipment 10B. In the venue V3, one or more display units 11, one or more projection units 12, one or more position sensors 13, and 14 are provided as system equipment 10C. In the venue V4, one or more display units 11, one or more projection units 12, one or more position sensors 13, and 14 are provided as the system equipment 10C.

In a state where the projection unit 12 included in the VR conferencing system is attached, the examiner P11 in the venue V1 can move as an avatar A11 in a virtual reality space of the VR examination place 20, change a posture of the avatar A11, and visually recognize a stereoscopic image 21 in the field of view at a position of the avatar A11 as an actually stereoscopically viewed image. The same applies to the examiners P21 to P41 in the other venues V2 to V4.

In practice, a stereoscopic image that can be three-dimensionally recognized can be displayed by providing a parallax between an image shown on the left eye and an image shown on the right eye of the examiner P11 from the projection display using a VR goggle 15 and the like described later.

The VR examination place 20 is a three-dimensional space virtually formed in the processing of a computer, and is formed, for example, as a box-shaped space that is the same as a room of a general conference hall. In the example shown in FIG. 1, the stereoscopic image 21 generated based on design data of a wire harness developed as a product is virtually present in a space of the VR examination place 20. More specifically, a three-dimensional model of the wire harness and a three-dimensional model of a large number of jigs disposed on a work platform used for manufacturing the wire harness are included in the stereoscopic image 21.

In addition, a stereoscopic image of the avatar A11, which is a character (doll or the like) corresponding to the examiner P11 in the venue V1, is disposed in a space of the VR examination place 20. Stereoscopic images of the avatars A21 to A24 corresponding to the respective examiners P21 to P41 in the other venues V2 to V4 are also disposed in the space of the VR examination place 20.

When the examiner P11 moves in a reality space in the venue V1, the position sensors 13 and 14 provided in the venue V1 detect a position change of the examiner P11. An actual three-dimensional position change of the examiner P11 detected by the position sensors 13 and 14 is reflected in a three-dimensional position change of the avatar A11 in the virtual space of the VR examination place 20. Further, an actual posture change of the examiner P11 is detected by the projection unit 12 worn by the examiner P11, and the result is reflected in the posture change of the avatar A11 in the VR examination place 20. The same applies to the examiners P21 to P41 and the avatars A21 to A41 in the other venues V2 to V4.

On the other hand, the display unit 11 disposed in the venue V1 is, for example, a computer including a two-dimensional display such as a notebook computer (PC), and is connected to be able to cooperate with the projection unit 12 in the venue V1. Specifically, an image of the VR examination place 20 in substantially the same range as a video shown in the field of view of the examiner P11 who wears the projection unit 12 in the venue V1 is displayed on a screen of the display unit 11 in a state synchronized with a position and posture of the projection unit 12. Of course, the screen of the display unit 11 is a two-dimensional display, and the stereoscopic image 21 in the VR examination place 20 is converted into a two-dimensional image and displayed on a two-dimensional screen of the display unit 11.

Similarly, the display unit 11 in the venue V2 can display, on the screen of the display unit 11 in the state synchronized with the position and posture of the projection unit 12, the image of the VR examination place 20 in substantially the same range as the video shown in the field of view of the examiner P21 who wears the projection unit 12 in the venue V2. The display unit 11 in the venue V3 can display, on the screen of the display unit 11 in the state synchronized with the position and posture of the projection unit 12, an image of the VR examination place 20 in substantially the same range as a video shown in the field of view of the examiner P31 who wears the projection unit 12 in the venue V3. The display unit 11 in the venue V4 can display, on the screen of the display unit 11 in the state synchronized with the position and posture of the projection unit 12, an image of the VR examination place 20 in substantially the same range as a video shown in the field of view of the examiner P41 who wears the projection unit 12 in the venue V4.

The display units 11 in the respective venues V1 to V4 are disposed on, for example, a desk. A microphone for collecting voice in the same venue and a speaker for voice amplification are also disposed on the same desk.

The examiner P11 in the venue V1 can simultaneously move around a virtual space of the VR examination place 20 by moving around the venue V1 in the reality space in the state with the projection unit 12 attached. That is, an actual movement of the examiner P11 is reflected in a change in a position and a posture viewed by the examiner P11 in the VR examination place 20, and is also reflected in the contents of the field of view of the examiner P11 projected by the projection unit 12. The same applies to the examiners P21 to P41 in the other venues V2 to V4.

By actually moving around, the examiners P11 to P41 in the respective venues V1 to V4 can visually grasp in detail a state such as a three-dimensional shape of a part of a product or a jig to be examined in the VR examination place 20.

Further, since the avatars A11 to A41 corresponding to the examiners P11 to P41 in the respective venues V1 to V4 are present in the VR examination place 20, the examiners P11 to P41 can immediately grasp the positions and the postures, which are viewed by the examiners who are at the other sites, according to the images projected by the own projection unit 12. Therefore, it is easy for a plurality of examiners at different sites to simultaneously confirm and examine the same part of a product in the VR examination place 20.

Each of the participants P12 to P42 other than the examiners P11 to P41 in the respective venues V1 to V4 can also grasp a video of a part examined by the examiners P11 to P41 based on the contents displayed by the display unit 11.

On the other hand, as will be described later, the projection unit 12 at each site includes a user operation unit that receives an input operation of each of the examiners P11 to P41. The display unit 11 at each site also includes a user operation unit that receives an input operation of each of the participants P12 to P42.

Each of the examiners P11 to P41 can add a correction operation such as a change, an addition, or a deletion to data of the stereoscopic image 21 in the VR examination place 20 by operating the user operation unit of the projection unit 12 worn by the examiners P11 to P41. The correction operation by each of the examiners P11 to P41 is recorded as data by the VR conferencing system, and is reflected in the stereoscopic image 21 in real time. As a result of the correction operation performed by any one of the examiners P11 to P41, the projection contents of the projection units 12 of all the examiners P11 to P41 and the display contents of the display units 11 of all the participants P12 to P42 are reflected in real time.

Therefore, all the examiners P11 to P41 present at different sites can simultaneously examine while confirming the same stereoscopic image 21 in substantially the same field of view using the common VR examination place 20, correct a shape, structure, layout, and the like of the product or jig projected as the stereoscopic image 21 as necessary, and confirm the correction result in real time. In addition, even for the participants P12 to P42 other than the examiners P11 to P41, by referring to a display screen of the display unit 11, it is possible to confirm a two-dimensional image corresponding to the stereoscopic image 21 at substantially the same field of view as that of the examiners P11 to P41 and simultaneously examine the two-dimensional image. Therefore, all participants of the online conference can efficiently perform the examination work.

Configuration of System

Figure 2:
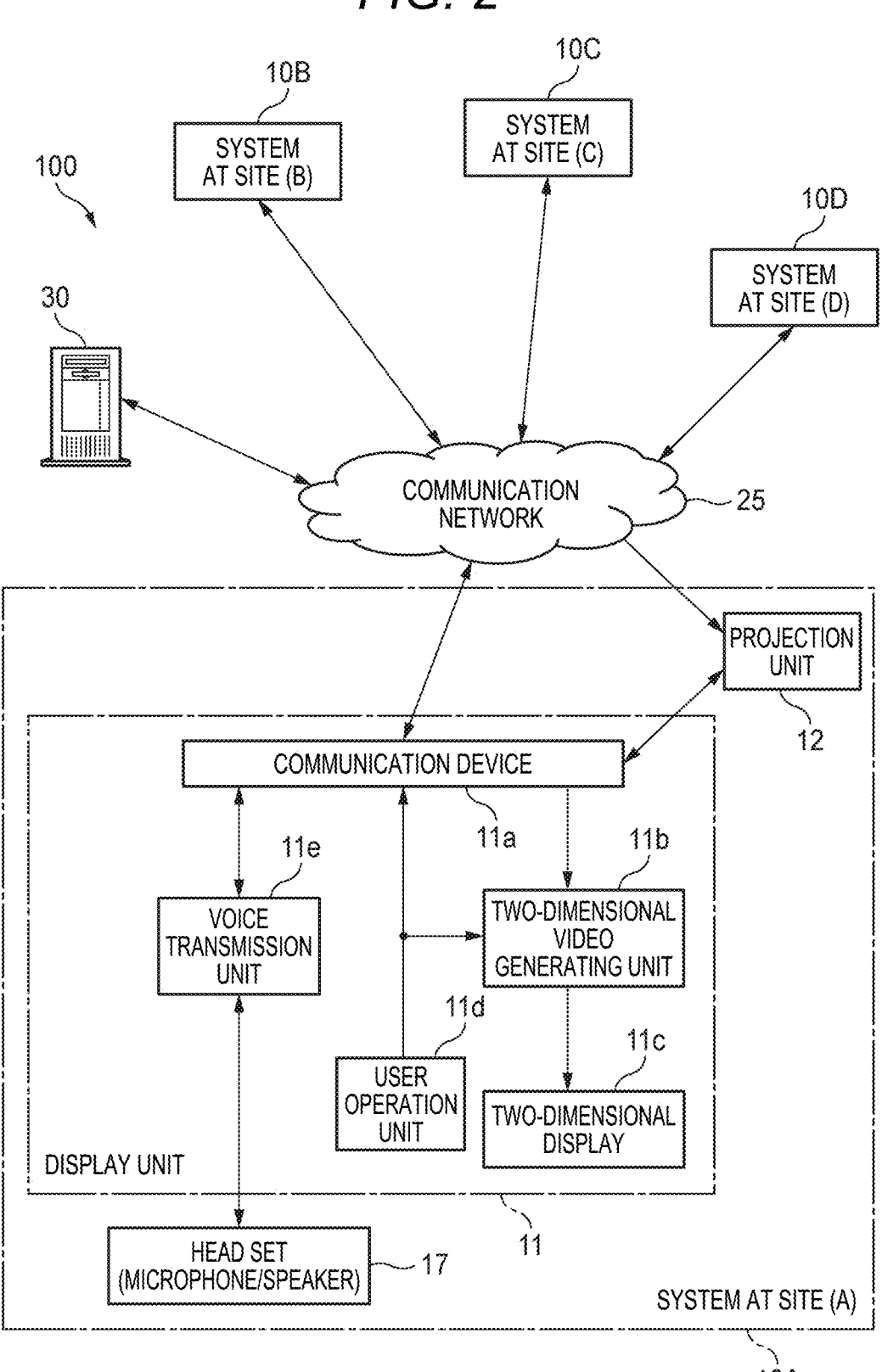
FIG. 2 is a block diagram showing a configuration
example of a VR conferencing system.
Figure 3:
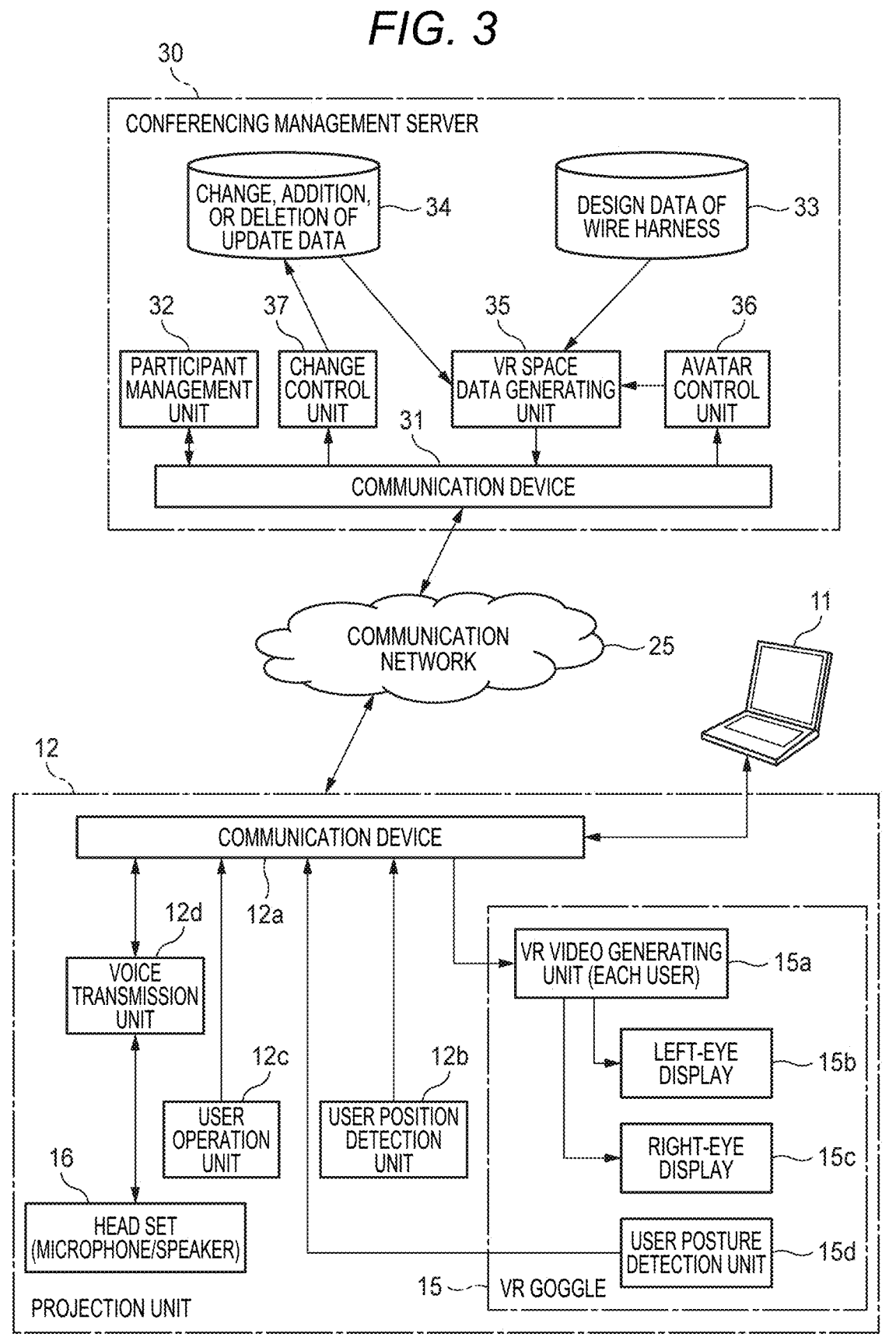

FIG. 2 is a block diagram showing a configuration example of the VR conferencing system 100. FIG. 3 is a block diagram showing a configuration example of a conferencing management server 30 and the projection unit 12.

In the example shown in FIG. 2, the system equipment 10A to 10D existing in the venues V1 to V4 at different sites H1 to H4 are connected to be able to communicate with each other via a communication network 25.

In order to enable simultaneous online conferences at the plurality of sites H1 to H4 using the common VR examination place 20, the conferencing management server 30 is connected to the communication network 25. The communication network 25 is assumed to include a local network existing in each of the sites H1 to H4, a dedicated communication line in a company, or a public communication line such as the Internet.

When the communication of the conference is performed via the Internet, the security of communication can be ensured by encrypting the data. In addition, the conferencing management server 30 may be provided at one place of the plurality of sites H1 to H4 or may be provided at a data center or the like at a place other than the sites H1 to H4.

The conferencing management server 30 shown in FIG. 3 includes a communication device 31, a participant management unit 32, database management units 33 and 34, a VR data generating unit 35, an avatar control unit 36, and a change control unit 37.

The communication device 31 has a function of safely performing data communication with the system equipment 10A to 10D at the respective sites H1 to H4 via the communication network 25.

The participant management unit 32 has a function of managing access to participants who participate in a common online conference with the examiners P11 to P41 or the participants P12 to P42.

The database management unit 33 holds and manages design data corresponding to the wire harness being developed. The design data includes data indicating shapes, dimensions, various components, and the like of each part of a target wire harness, and data indicating shapes and layouts of various jigs used for manufacturing the wire harness.

The database management unit 34 has a function of holding and managing update data indicating a correction portion for data of a specific version held by the database management unit 33. For example, data indicating that a shape of a specific part of the wire harness is changed, data indicating that a new component is added to the specific part of the wire harness, data indicating that a component of the specific part of the wire harness is deleted, and the like are sequentially registered and held in the database management unit 34 during the online conference.

The VR data generating unit 35 generates data of the stereoscopic image 21 disposed in a three-dimensional virtual space of the VR examination place 20. The data of the stereoscopic image 21 generated by the VR data generating unit 35 includes a stereoscopic image corresponding to the design data of the wire harness held by the database management unit 33, a stereoscopic image corresponding to each avatar managed by the avatar control unit 36, and a stereoscopic image corresponding to the update data managed by the database management unit 34.

The avatar control unit 36 has a function of constantly monitoring a position (three-dimensional coordinates) and posture (direction of the line of sight) of each of the examiners P11 to P41 and grasping a latest state while managing, as the avatars A11 to A41, characters in the VR examination place 20 corresponding to the examiners P11 to P41 at the respective sites H1 to H4 who participate in the online conference of the VR conferencing system 100.

The change control unit 37 has a function of receiving, as a correction instruction for the stereoscopic image 21 in the VR examination place 20, an input operation performed by the examiners P11 to P41 at the respective sites H1 to H4 who participate in the online conference of the VR conferencing system 100 to the user operation unit of the projection unit 12 and an input operation performed by the participants P12 to P42 at the respective sites H1 to H4 to a user operation unit of the display unit 11, and registering the input operations in the database management unit 34 as update data indicating a change, an addition, a deletion, or the like to the stereoscopic image 21.

On the other hand, the projection unit 12 shown in FIG. 3 includes a communication device 12a, a user position detection unit 12b, a user operation unit 12c, a voice transmission unit 12d, the VR goggle 15, and a head set 16. The VR goggle 15 includes functions of a VR video generating unit 15a, a left-eye display 15b, a right-eye display 15c, and a user posture detection unit 15d. The head set 16 incorporates a microphone and a speaker.

The communication device 12a is connected to the conferencing management server 30 via the communication network 25, and can transmit and receive data to and from the conferencing management server 30. Specifically, the data of the stereoscopic image 21 in the VR examination place 20 is periodically acquired from the conferencing management server 30. The data of the stereoscopic image 21 acquired by the communication device 12a from the conferencing management server 30 includes design data such as a three-dimensional shape and a layout of the jigs of the wire harness and data of a three-dimensional shape, a position, and a posture of each of the avatars A11 to A41.

In addition, for example, the communication device 12a in the projection unit 12 at the site H1 can periodically transmit, to the conferencing management server 30, information on three-dimensional position coordinates of the examiner P11 detected by the position sensors 13 and 14 at the site H1 and the posture (direction of the line of sight) of the examiner P11 detected by the VR goggle 15 worn by the examiner P11.

Further, for example, the communication device 12a in the projection unit 12 at the site H1 is connected to the display unit 11 at the site H1, and it is possible to periodically transmit, to the display unit 11, information indicating a range of the field of view in a virtual reality space of the examiner P11 specified based on the three-dimensional position coordinates of the examiner P11 and the posture of the examiner P11.

The user position detection unit 12b can detect three-dimensional position coordinates and a change in the three-dimensional position coordinates in a reality space of each of the examiners P11 to P41 based on detection states of a pair of position sensors 13 and 14 disposed at parts facing the examiners P11 to P41 who wear the VR goggle 15 at the respective sites H1 to H4.

The user operation unit 12c is a device capable of receiving various button operations and coordinate input operations by a user, such as a mouse which is a general input device. In the present embodiment, the user operation unit 12c can receive input operations by the examiners P11 to P41 who wear the VR goggle 15 of the projection unit 12. Specifically, the user operation unit 12c can perform a correction instruction such as a change, an addition, or a deletion to the movement or the like of a user designated part in the stereoscopic image 21 of the VR examination place 20 projected from the VR goggle 15.

The voice transmission unit 12d can transmit, to another site via the communication device 12a and the communication network 25, information on voice uttered by an examiner taken in from the microphone of the head set 16. Further, the voice transmission unit 12d can receive information on voice uttered by an examiner at each of the other sites via the communication network 25 and the communication device 12a, and output the information as a voice from the speaker of the head set 16.

The VR goggle 15 have a function of projecting an image that can be three-dimensionally recognized on the left and right eyes of the user who wears the VR goggle 15.

The VR video generating unit 15a constantly recognizes a state of a position and posture (for example, direction of a line of sight) of a user (examiners P11 to P41) in the three-dimensional virtual space of the VR examination place 20, and specifies a range of the field of view of the user. Then, the VR video generating unit 15a acquires, from the conferencing management server 30, at least data in the range of the field of view of the user among the data of the stereoscopic image 21 existing in the three-dimensional virtual space of the VR examination place 20, and generates two types of two-dimensional image data viewed from viewpoint positions of the left and right eyes of the user by coordinate transformation of the data of the stereoscopic image 21.

The left-eye display 15b receives the left-eye two-dimensional image data generated by the VR video generating unit 15a from the VR video generating unit 15a, and projects the left-eye two-dimensional image data to a position of the left eye of the user as a two-dimensional image.

The right-eye display 15c receives the right-eye two-dimensional image data generated by the VR video generating unit 15a from the VR video generating unit 15a, and projects the right-eye two-dimensional image data to a position of the right eye of the user as a two-dimensional image.

The user posture detection unit 15d detects a direction of a line of sight of the user, for example, by tracking positions of the irises of the user captured by a camera or the like. Alternatively, an angle in a triaxial direction (roll angle, pitch angle, and yaw angle) indicating an orientation of a head of the user is detected using a triaxial acceleration sensor or the like.

The posture of the user detected by the user posture detection unit 15d and the information on the position detected by the user position detection unit 12b are input to the conferencing management server 30 via the communication device 12a and the communication network 25. The position and posture of the user are reflected in the positions and the postures of the corresponding avatar A11 to A41 in the virtual reality space in the VR examination place by a process of the conferencing management server 30.

On the other hand, the display unit 11 shown in FIG. 2 includes a communication device 11a, a two-dimensional video generating unit 11b, a two-dimensional display 11c, a user operation unit 11d, and a voice transmission unit 11e.

The communication device 11a is connected to the conferencing management server via the communication network 25, and can transmit and receive data to and from the conferencing management server 30. Specifically, the data of the stereoscopic image 21 in the VR examination place 20 is periodically acquired from the conferencing management server 30.

The communication device 11a is connected to the projection unit 12 at the same site, and can acquire, from the projection unit 12, information necessary for synchronizing a range of the field of view of an examiner who wears the projection unit 12 and a display range of the display unit 11.

The two-dimensional video generating unit 11b specifies, from the information transmitted from the projection unit 12, the range of the field of view of the examiner who wears the projection unit 12 at the same site, and acquires, from the conferencing management server 30, the data of the stereoscopic image 21 present in the three-dimensional virtual space of the VR examination place 20 in a range equivalent to the field of view of the examiner. Then, two-dimensional image data of an image viewed from a viewpoint position of the examiner is generated by coordinate conversion of the data of the stereoscopic image 21.

The two-dimensional display 11c displays the two-dimensional image data generated by the two-dimensional video generating unit 11b on a screen as a two-dimensional image. The display unit 11 may acquire, from the projection unit 12, any one of the two types of two-dimensional image data for the left and right eyes generated by the VR video generating unit 15a of the VR goggle 15, and display the data on the two-dimensional display 11c.

The user operation unit 11d is a device capable of receiving various button operations and coordinate input operations by a user, such as a mouse or a keyboard which is a general input device. In the present embodiment, the user operation unit 11d can receive input operations by the participants P12 to P42. Specifically, the user operation unit 11d can perform a correction instruction such as a change, an addition, or a deletion to the movement or the like of a user designation part in the stereoscopic image 21 of the VR examination place 20 displayed on a screen of the two-dimensional display 11c.

The voice transmission unit 11e can transmit, to another site via the communication device 11a and the communication network 25, information on voice uttered by a participant taken in from a microphone of the head set 17. Further, the voice transmission unit 11e can receive information on voice uttered by an examiner or a participant at each of the other sites via the communication network 25 and the communication device 11a, and output the information as a voice from a speaker of the head set 17.

Operation of System

Figure 4:
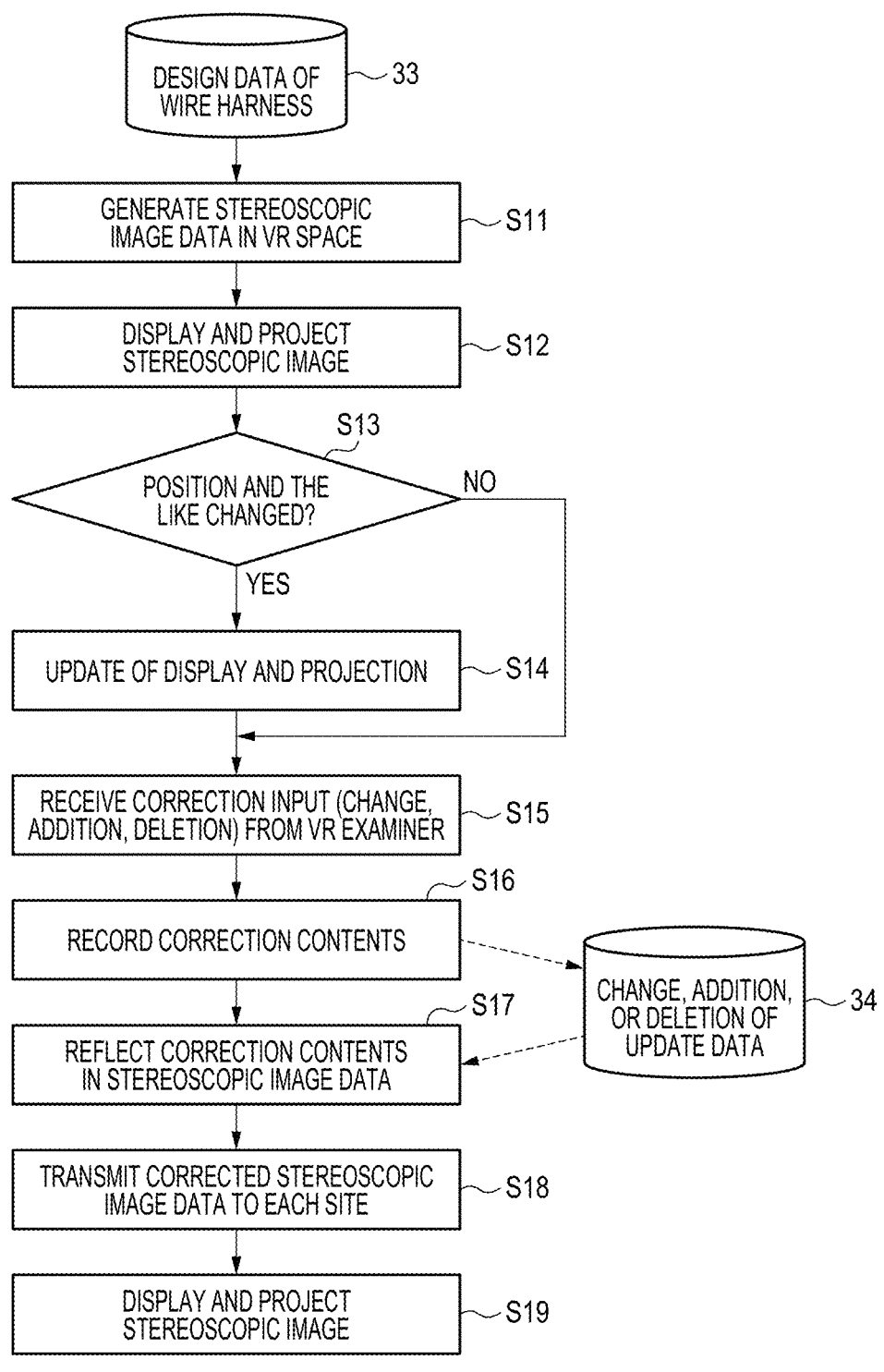
FIG. 4 is a flowchart showing a flow of processes in the
VR conferencing system.

FIG. 4 is a flowchart showing a flow of processes in the VR conferencing system 100. The processes shown in FIG. 4 will be described below.

The VR data generating unit 35 on the conferencing management server 30 generates three-dimensional data of the stereoscopic image 21 in the VR space of the VR examination place 20 based on the design data of the wire harness held by the database management unit 33 (S11). For each of the avatars A11 to A41 managed by the avatar control unit 36, the VR data generating unit 35 also generates three-dimensional data of the stereoscopic image 21 in the VR space of the VR examination place 20. When the database management unit 34 holds the update data, the data of the stereoscopic image 21 is corrected by reflecting the content of the update data.

When the online conference is started using the VR conferencing system 100, the projection unit 12 worn by the examiners P11 to P41 at the sites and the display unit 11 used by the participants P12 to P42 are connected to the conferencing management server 30 via the communication network 25 so that the projection unit 12, the display unit 11, and the conferencing management server 30 can communicate with each other.

The projection unit 12 at each site acquires the data of the stereoscopic image 21 in the VR examination place 20 generated by the VR data generating unit 35 of the conferencing management server 30, performs coordinate conversion of the data to be a stereoscopic image shown in the field of view of each of the right and left eyes of each of the examiners P11 to P41, and projects the stereoscopic image so that the respective examiners P11 to P41 can visually recognize the stereoscopic image by the VR goggle 15 (S12).

Further, the display unit 11 at each site acquires the data of the stereoscopic image 21 in the VR examination place 20 generated by the VR data generating unit 35 of the conferencing management server 30, performs coordinate conversion of the data to substantially match a stereoscopic image shown in the field of view of each of the examiners P11 to P41 in the same site, and displays the data on the screen of the two-dimensional display 11c (S12).

When each of the examiners P11 to P41 moves in the reality space or changes the posture or the line of sight while visually recognizing the stereoscopic image projected from the VR goggle 15, the change is detected by the user position detection unit 12b and the user posture detection unit 15d. The change in the posture and the line of sight of each of the examiners P11 to P41 in the reality space is reflected in the change of the field of view in the VR examination place 20 of the examiner.

The VR video generating unit 15a of the VR goggle 15 updates the stereoscopic image to be projected on the left-eye display 15b and the right-eye display 15c in accordance with the change in the field of view of the examiner (S13) (S14). In addition, the two-dimensional video generating unit 11b of the display unit 11 updates the image displayed on the two-dimensional display 11c so as to follow the change in the field of view of the examiner (S13) present at the same site (S14).

By operating the user operation unit 12c, the examiners P11 to P41 at the respective sites can change a part of interest of a stereoscopic image shown in his or her field of view as necessary (S15). For example, it is possible to change a shape of a part of interest of the wire harness, move a position at which each jig is disposed, and add or delete a component or a jig of the wire harness.

The correction input by an input operation of the examiners P11 to P41 at the respective sites is input from the projection unit 12 to the conferencing management server 30 via the communication network 25. The change control unit 37 of the conferencing management server 30 receives the correction input from each of the examiners P11 to P41 and records the contents thereof as update data in the database management unit 34 (S16).

When the VR data generating unit 35 of the conferencing management server 30 detects that new update data is added to the database management unit 34, the VR data generating unit 35 of the conferencing management server 30 generates new data of the stereoscopic image 21 by reflecting the correction contents of the update data in the stereoscopic image 21 of the VR examination place 20 generated by the VR data generating unit 35 (S17).

The communication device 31 of the conferencing management server 30 transmits, to each of the system equipment 10A to 10D at the respective sites H1 to H4, the corrected data of the stereoscopic image 21 generated by the VR data generating unit 35 (S18).

The projection unit 12 at each site acquires the data of the corrected stereoscopic image 21 transmitted from the conferencing management server 30, performs coordinate conversion of the data to be a stereoscopic image shown in the field of view of each of the right and left eyes of each of the examiners P11 to P41, and projects the stereoscopic image so that the respective examiners P11 to P41 can visually recognize the stereoscopic image by the VR goggle 15 (S19).

Further, the display unit 11 at each site acquires the corrected data of the stereoscopic image 21 transmitted from the conferencing management server 30, performs coordinate conversion of the data to substantially match a stereoscopic image shown in the field of view of each of the examiners P11 to P41 in the same site, and displays the data on the screen of the two-dimensional display 11c (S19).

Therefore, by using the VR conferencing system 100 shown in FIGS. 2 and 3, as shown in FIG. 1, all of the examiner P11 and the participant P12 at the site H1, the examiner P21 and the participant P22 at the site H2, the examiner P31 and the participant P32 at the site H3, and the examiner P41 and the participant P42 at the site H4 can hold an online conference using the virtual reality space of the common VR examination place 20 without moving.

In particular, the examiners P11 to P41 can stereoscopically recognize the stereoscopic image 21 projected by the VR goggle 15 in the same manner as a real object, and the movement and posture change of the examiners P11 to P41 are reflected in the fields of view of the examiners P11 to P41 in the space of the VR examination place 20, and thus it is easy to confirm in detail a three-dimensional shape and structure of a part required to be examined.

In addition, since the avatars A11 to A41 corresponding to the examiners P11 to P14 at the respective sites are included in the stereoscopic image 21 in the VR examination place 20, the examiners P11 to P14 can also recognize a part on the wire harness, a direction of a line of sight, and the like confirmed by other examiners. That is, the examiners P11 to P14 can easily grasp a relative positional relation or the like between the examiners while being present at sites of different places, and thus it is possible to efficiently perform an operation of confirming a common target part on the stereoscopic image 21 by all the examiners as in the case of holding a conference in a common reality space.

Further, the examiners P11 to P14 at the respective sites can perform a correction operation such as a change, an addition, or a deletion on the stereoscopic image 21 by performing an input operation as necessary. In addition, by reflecting a result of the correction operation on the content of the projected stereoscopic image 21, the examiners P11 to P14 at the respective sites can easily grasp a three-dimensional shape and a structure of the corrected stereoscopic image 21.

In addition, the participants P12 to P42 at the respective sites can confirm a two-dimensional image in substantially the same range as the stereoscopic image 21 reflected in the field of view of the examiners P11 to P14 at the same site on the screen display of the display unit 11. Therefore, even in a case where there is no real model or the like in each of the venues V1 to V4, the participants P12 to P42 also easily grasp a shape and structure of the part to be examined, similarly to the examiners P11 to P14.

Procedure of Product Development Work

Figure 5:
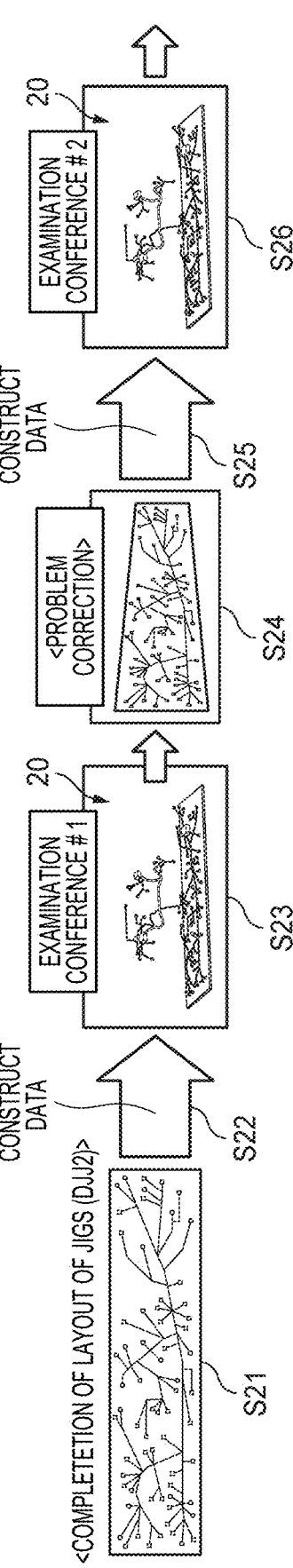
FIG. 5 is a state transition diagram showing an example
of a work procedure for product development.

An example of a work procedure for product development is shown in FIG. 5. That is, when a component manufacturer that manufactures a wire harness to be mounted on an automobile and the related company uses the VR conferencing system 100 described above, it is assumed that a development operation is performed in the procedure shown in FIG. 5.

After the design of the configuration and the shape of the wire harness is completed, the designer determines a layout of a large number of jigs used for the routing work of an electric wire group and the like at the time of manufacturing the wire harness (S21).

In S22, the designer constructs data for an examination conference including design data of the wire harness determined in advance and data of the layout of the jigs determined in S21. This data is registered in the database management unit 33.

The designer and the person in charge at each site hold a first examination conference using the VR conferencing system 100 (S23). At the time of this examination conference, by using the VR examination place 20 of the VR conferencing system 100, the designer and the person in charge at each site can participate in an online conference without moving from each site.

The designer or the like extracts a problem relating to the layout of the jigs or the like in the first examination conference, and performs a correction operation on the stereoscopic image 21 based on an input operation using the user operation unit 12c or the like (S24). Accordingly, the projected stereoscopic image 21 is corrected, and the update data indicating the correction contents is registered in the database management unit 34.

The designer or the like reconstructs the design data on the database management unit 33 so as to reflect the contents of all the update data registered in the database management unit 34 (S25).

The designer and the person in charge at each site hold a second examination conference using the VR conferencing system 100 (S26). At the time of this examination conference, by using the VR examination place 20 of the VR conferencing system 100, the designer and the person in charge at each site can participate in an online conference without moving from each site.

In the case of the work procedure as shown in FIG. 5, since the person in charge at each site can immediately participate in the online conference without moving and start the examination, it is possible to shorten a cycle of the examination conference and to shorten a development period of the product.

The present disclosure is not limited to the above-described embodiment, and may be appropriately modified, improved, and the like. In addition, materials, shapes, sizes, numbers, arrangement positions and the like of components in the above-described embodiment are freely selected and are not limited as long as the present disclosure can be implemented.

For example, in the above-described embodiment, it is assumed that an online conference is held using the VR conferencing system 100 to examine the design of a wire harness for an automobile at the plurality of sites. Not only the wire harness but also various types of products can be disposed as the stereoscopic image 21 in the VR examination place 20 to be examined.

When a function equivalent to that of the conferencing management server 30 is installed in any of the system equipment 10A to 10D at the plurality of sites, the conferencing management server 30 may be omitted.

Characteristic matters regarding the above virtual reality conferencing system are briefly summarized in the following [1] to [5].

[1] A virtual reality conferencing system (VR conferencing system 100) including:

a projection unit (12) disposed at each of a plurality of separate sites (H1 to H4) and configured to project a stereoscopic image (21) generated based on design data of a product in a VR space (VR examination place 20) recognizable by a user at each site; and a display unit (11) connected to the projection unit at each of the plurality of sites and configured to display the stereoscopic image recognized by the user on a screen, in which the display units at the plurality of sites are connected to each other via a communication system, each of the display units and the projection units includes an input unit (user operation units 12c and 11d) that allows an input of one or more correction instructions indicating change, addition, and/or deletion to the stereoscopic image, and the correction instruction input to the input unit at one site is transmitted to the display unit at another site via the communication system, and the correction instruction is reflected on a stereoscopic image projected at each projection unit (S15 to S19).

According to the virtual reality conferencing system having a configuration of the above [1], examiners (users) at the plurality of sites visually recognize projected images of the projection unit, so that all the examiners can easily simultaneously examine the same stereoscopic image. According to the display of the display unit, participants other than the examiners can also participate in a conference while recognizing the same image as the examiners. Further, since each examiner can input a correction instruction for adding a change to the stereoscopic image while confirming the stereoscopic image, and this correction instruction is reflected in the contents of the stereoscopic image projected at each site, all examiners and participants can easily recognize a result of the correction.

[2] The virtual reality conferencing system according to the above [1], wherein the design data includes information (contents of the database management unit 33) indicating a three-dimensional shape of a routing path in a wire harness.

According to the virtual reality conferencing system having a configuration of the above [2], even when a manufacturing process or the like of the wire harness having a complicated three-dimensional shape is examined, the stereoscopic image can be projected in a state where the three-dimensional shape is accurately reproduced on the wire harness, the routing path thereof, and the like. Accordingly, it is not necessary to prepare an actual model or the like of the wire harness for examination, and it is not necessary for the examiner at each site to move and gather at one place.

[3] The virtual reality conferencing system according to [1] or [2], further including:

a user state detection unit (user position detection unit 12*b*, user posture detection unit 15*d*) configured to detect a posture and a position of a specific user who wears the projection unit at one or more sites, and a display control unit (VR video generating unit 15*a*) configured to reflect a change in the posture and the position detected by the user state detection unit in a display form of the stereoscopic image projected by the projection unit.

According to the virtual reality conferencing system having a configuration of the above [3], since a range of the field of view in the VR space is changed only by moving or changing a posture in the reality space by the examiner (specific user) who wears the projection unit, a special input operation for changing the field of view becomes unnecessary, and an efficient online conference becomes possible.

[4] The virtual reality conferencing system according to [3], wherein the projection unit includes an avatar control unit (36) configured to project information of an avatar corresponding to one or more specific users into the VR space together with the stereoscopic image, and the avatar control unit reflects a change in a position of at least one of the specific users in a position of an avatar projected in the VR space.

According to the virtual reality conferencing system having a configuration of the above [4], each of the examiners who view a stereoscopic image in the VR space can easily specify a place which is being examined by another examiner to an avatar appearing in the same VR space. As a result, the plurality of examiners can easily recognize a common target part of the stereoscopic image.

[5] The virtual reality conferencing system according to any one of [1] to [4], wherein each of the plurality of sites includes a voice input and output unit (head set 16, voice transmission unit 12*d*), and information on a voice uttered by a specific user who wears the projection unit at one or more sites is output from the voice input and output unit at another site via the communication system.

According to the virtual reality conferencing system having a configuration of the above [5], even in the case of an online conference across a plurality of sites, an examination item can be transmitted between a plurality of examiners using voice.

The present application is based on Japanese Patent Application No. 2022-52161 filed on Mar. 28, 2022, the contents of which are incorporated herein by reference.

REFERENCE SIGNS LIST

10A, 10B, 10C, 10D: system equipment
11: display unit
11*a*: communication device
11*b*: two-dimensional video generating unit
11*c*: two-dimensional display
11*d*: user operation unit
11*e*: voice transmission unit
12: projection unit
12*a*: communication device
12*b*: user position detection unit
12*c*: user operation unit
12*d*: voice transmission unit
13, 14: position sensor
15: VR goggle
15*a*: VR video generating unit
15*b*: left-eye display
15*c*: right-eye display
15*d*: user posture detection unit
16, 17: head set
20: VR examination place
21: stereoscopic image
25: communication network
30: conferencing management server
31: communication device
32: participant management unit
33, 34: database management unit
35: VR data generating unit
36: avatar control unit
37: change control unit
100: VR conferencing system
A11, A21, A31, A41: avatar
H1, H2, H3, H4: site
P11, P21, P31, P41: examiner
P12, P22, P32, P42: participant
V1, V2, V3, V4: venue

The invention claimed is:

1. A virtual reality conferencing system comprising:
a conference management server configured to store design data of a product;
a projection unit disposed at each of a plurality of separate sites and configured to obtain the design data of the product from the conference management server, and to project a stereoscopic image generated based on the design data of the product in a VR space recognizable by a user at each site; and
a display unit connected to the projection unit at each of the plurality of sites and configured to display the stereoscopic image recognized by the user on a screen, wherein:
the display unit and the projection unit are each configured to communicate with the conference management server to obtain the design data of the product;
the display unit is configured to determine a field of view of the user wearing the projection unit, and generate, using the design data obtained from the conference management server, a display of an image of the VR space in a same range as a video shown in the field of view of the user wearing the projection unit in a state synchronized with a position and posture of the projection unit;

the display units at the plurality of sites are connected to each other via a communication system;

each of the display units and the projection units includes an input unit that allows an input of one or more correction instructions indicating change, addition, and/or deletion to the stereoscopic image; and the correction instruction input to the input unit at one site is transmitted to the display unit at another site via the conference management server and the communication system, and the correction instruction is reflected on a stereoscopic image projected at each projection unit; and wherein the conference management server is configured to modify the design data of the product based on the correction instruction input to the input unit.

2. The virtual reality conferencing system according to claim 1, wherein the design data includes at least information indicating a three-dimensional shape of a routing path in a wire harness.

3. The virtual reality conferencing system according to claim 1, further comprising:

a user state detection unit configured to detect a posture and a position of a specific user who wears the projection unit at one or more sites; and a display control unit configured to reflect a change in the posture and the position detected by the user state detection unit in a display form of the stereoscopic image projected by the projection unit.

4. The virtual reality conferencing system according to claim 3, wherein:

the projection unit includes an avatar control unit configured to project information of an avatar corresponding to one or more specific users into the VR space together with the stereoscopic image; and the avatar control unit reflects a change in a position of at least one of the specific users in a position of an avatar projected in the VR space.

5. The virtual reality conferencing system according to claim 1, wherein:

each of the plurality of sites includes a voice input and output unit; and information on a voice uttered by a specific user who wears the projection unit at one or more sites is output from the voice input and output unit at another site via the communication system.

* * * * *